United States Patent
Banks

(10) Patent No.: US 9,469,976 B1
(45) Date of Patent: Oct. 18, 2016

(54) HOUSING FOR DRAIN OUTLET

(71) Applicant: Douglas W. Banks, Hurdle Mills, NC (US)

(72) Inventor: Douglas W. Banks, Hurdle Mills, NC (US)

( * ) Notice: Subject to any disclaimer, the term of this patent is extended or adjusted under 35 U.S.C. 154(b) by 0 days.

(21) Appl. No.: 14/976,891

(22) Filed: Dec. 21, 2015

Related U.S. Application Data

(60) Provisional application No. 62/138,097, filed on Mar. 25, 2015.

(51) Int. Cl.
| | |
|---|---|
| *E03B 7/12* | (2006.01) |
| *F22G 3/00* | (2006.01) |
| *F16L 5/00* | (2006.01) |
| *E03B 7/10* | (2006.01) |

(52) U.S. Cl.
CPC . *E03B 7/12* (2013.01); *E03B 7/10* (2013.01); *F16L 5/00* (2013.01); *F22G 3/008* (2013.01); *F22G 3/003* (2013.01); *Y10T 137/698* (2015.04); *Y10T 137/7036* (2015.04); *Y10T 137/7043* (2015.04); *Y10T 137/7062* (2015.04)

(58) Field of Classification Search
CPC ............... Y10T 137/7062; Y10T 137/7036; Y10T 137/7043; Y10T 137/698; E03B 7/10; E03B 7/12; F16L 5/00; F22G 3/003; F22G 3/008
USPC ................. 137/375, 377, 360, 382; 285/47
See application file for complete search history.

(56) References Cited

U.S. PATENT DOCUMENTS

| | | | | | |
|---|---|---|---|---|---|
| 2,650,180 | A | * | 8/1953 | Walker | F16L 59/024 137/375 |
| 2,990,846 | A | * | 7/1961 | Rives | F16K 43/00 137/377 |
| 3,570,809 | A | * | 3/1971 | Stuy | A47L 5/38 137/360 |
| 3,858,632 | A | * | 1/1975 | Stout | F16L 59/161 137/375 |

(Continued)

FOREIGN PATENT DOCUMENTS

| | | | |
|---|---|---|---|
| DE | 29708757 U1 * | 11/1997 | ............... E03B 7/12 |
| DE | 29708757 U1 | 12/1997 | |

(Continued)

OTHER PUBLICATIONS

NPL #1—English translation of DE29708757 as obtained from Espacenet.*

(Continued)

*Primary Examiner* — Kevin Murphy
*Assistant Examiner* — Josephine Trinidad-Borges
(74) *Attorney, Agent, or Firm* — Michael G. Johnston; Moore & Van Allen PLLC

(57) ABSTRACT

An apparatus is provided for protecting from freezing an above-ground conduit outlet on an exterior wall of a building, the freeze protection apparatus comprising a housing including a top wall, a front wall, and a pair of opposed side walls interconnecting the top wall and the front wall. The housing partially defines an enclosed area having a rear aperture and a bottom aperture. Thermal insulating material lines the interior surface of the walls of the housing. Means are provided for mounting the housing to the exterior wall adjacent the conduit outlet. The inner edges of the side walls and the top wall contact the exterior wall and the bottom edges of the side walls and the front wall contact the ground for enclosing the conduit outlet. Heat is retained within the housing to prevent fluid within the conduit from freezing.

6 Claims, 6 Drawing Sheets

(56) References Cited

U.S. PATENT DOCUMENTS

| | | | |
|---|---|---|---|
| 3,981,153 A * | 9/1976 | Bleek | E01F 5/005 |
| | | | 405/124 |
| 4,380,245 A * | 4/1983 | Hefner | F16K 49/00 |
| | | | 137/375 |
| 4,890,638 A | 1/1990 | Davenport | |
| 5,614,119 A | 3/1997 | Ollis | |
| 5,875,812 A * | 3/1999 | Miller | F16L 5/00 |
| | | | 137/334 |
| 6,173,733 B1 | 1/2001 | Pruitt et al. | |
| 6,206,030 B1 | 3/2001 | Barthuly | |
| 6,889,394 B2 * | 5/2005 | Guillen | A47K 1/00 |
| | | | 137/382 |
| 8,511,336 B1 | 8/2013 | Schumacher | |
| 2005/0247009 A1* | 11/2005 | Vagedes | F16K 27/12 |
| | | | 52/698 |
| 2006/0042694 A1* | 3/2006 | Reineck | F16K 35/10 |
| | | | 137/377 |
| 2007/0272305 A1* | 11/2007 | Schumacher | F16K 27/12 |
| | | | 137/382 |
| 2013/0327761 A1* | 12/2013 | Warmuth | F27D 7/00 |
| | | | 219/494 |
| 2014/0263343 A1 | 9/2014 | Geerligs et al. | |

FOREIGN PATENT DOCUMENTS

| | | |
|---|---|---|
| FR | 2663060 A1 | 12/1991 |
| FR | 2664961 A1 | 1/1992 |
| JP | 2006316559 A | 11/2006 |
| JP | 2007197919 A | 8/2007 |
| KR | 101194416 B1 | 10/2012 |

OTHER PUBLICATIONS

Tap Boxes, Outside Tap Box, www.tapboxes.co.uk.
Tap Safe, Tamperproof and vandal resistant lockable protective cover for outside taps, http://tap-safe.co.uk/.
Plumbers in Darlington, Monthly Tip—Outdoor Taps, http://darlingtonplumbers.co.uk/tip-of-the-month.

* cited by examiner

HOUSING FOR DRAIN OUTLET

CROSS-REFERENCES

This application is related to U.S. provisional application No. 62/138,097, filed Mar. 25, 2015, entitled "HOUSING FOR DRAIN OUTLET", naming Doug Banks as the inventor. The contents of the provisional application are incorporated herein by reference in their entirety, and the benefit of the filing date of the provisional application is hereby claimed for all purposes that are legally served by such claim for the benefit of the filing date.

BACKGROUND

This invention relates generally to a housing for a drain outlet, and more particularly to a housing for a drain outlet for a condensing furnace.

Condensing furnaces are gas fired furnaces having at least 90% annual fuel utilization efficiency. Condensing furnaces can produce from three to seven gallons of condensate fluid daily during the heat cycle. Drain lines carry the condensate fluid to the exterior of the house or dwelling holding the condensing furnace. Typically, the drain line outlet exits the house through the foundation. During cold weather, the fluid in the drain outlet is prone to freezing, especially when the cold weather is accompanied by windy conditions, which significantly contribute to increased "chill-factors" that initiate the condensate freezing process.

Once the condensate fluid freezes at the exposed drain line outlet termination point, the furnace immediately shuts off. A service call would be needed at this time to thaw the drain line. Unfortunately, this is only a temporary fix as the drain line may freeze again.

For the foregoing reasons, there is a need for a housing for a drain outlet that will prevent freezing of the fluid passing from the drain outlet. Ideally, the housing will allow for relatively quick and easy installation or replacement.

SUMMARY

An apparatus is provided for protecting from freezing an above-ground conduit outlet on an exterior wall of a building, the freeze protection apparatus comprising a housing adapted for covering the conduit outlet. The housing includes a top wall, a front wall, and a pair of opposed side walls interconnecting the top wall and the front wall. The housing partially defines an enclosed area having a rear aperture and a bottom aperture. Thermal insulating material lines the interior surface of the walls of the housing. Means are provided for mounting the housing to the exterior wall adjacent the conduit outlet, wherein the inner edges of the side walls and the top wall contact the exterior wall and the bottom edges of the side walls and the front wall contact the ground below the conduit outlet for enclosing the conduit outlet within an enclosed space defined by the housing, exterior wall and the ground. Heat is retained within the housing to prevent fluid within the conduit from freezing.

An apparatus is provided for protecting from freezing an above-ground conduit outlet on an exterior wall of a building, the freeze protection apparatus comprising a housing adapted for covering the conduit outlet. The housing includes a top wall, a front wall, and a plurality of opposed side walls interconnecting the top wall and the front wall. The housing partially defines an enclosed area having a rear aperture and a bottom aperture. Thermal insulating material lines the interior surface of the walls of the housing. Means are provided for mounting the housing to the exterior wall adjacent the conduit outlet, wherein the inner edges of the side walls and the top wall contact the exterior wall and the bottom edges of the side walls and the front wall contact the ground below the conduit outlet for enclosing the conduit outlet within an enclosed space defined by the housing, exterior wall and the ground. Heat is retained within the housing to prevent fluid within the conduit from freezing.

BRIEF DESCRIPTION OF THE DRAWINGS

For a more complete understanding of the present invention, reference should now be had to the embodiments shown in the accompanying drawings and described below. In the drawings.

DESCRIPTION

Figure 1:
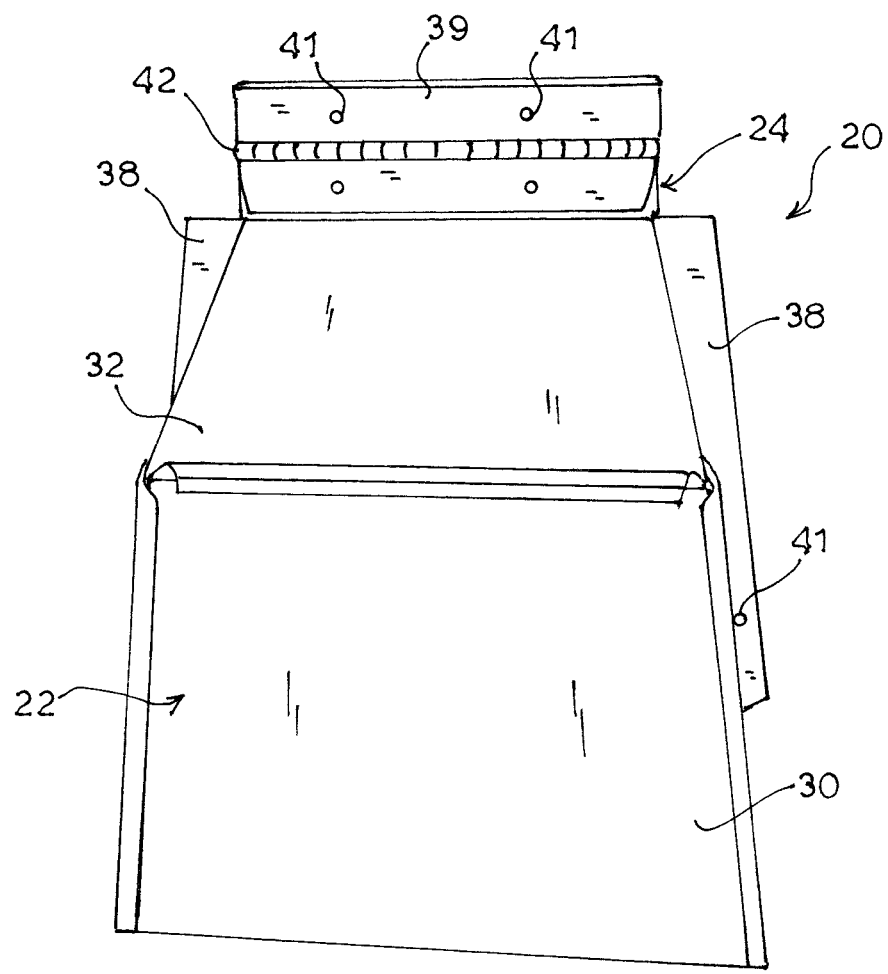
FIG. 1 is a front perspective view of an embodiment of a housing for accommodating a drain outlet.
Figure 2:
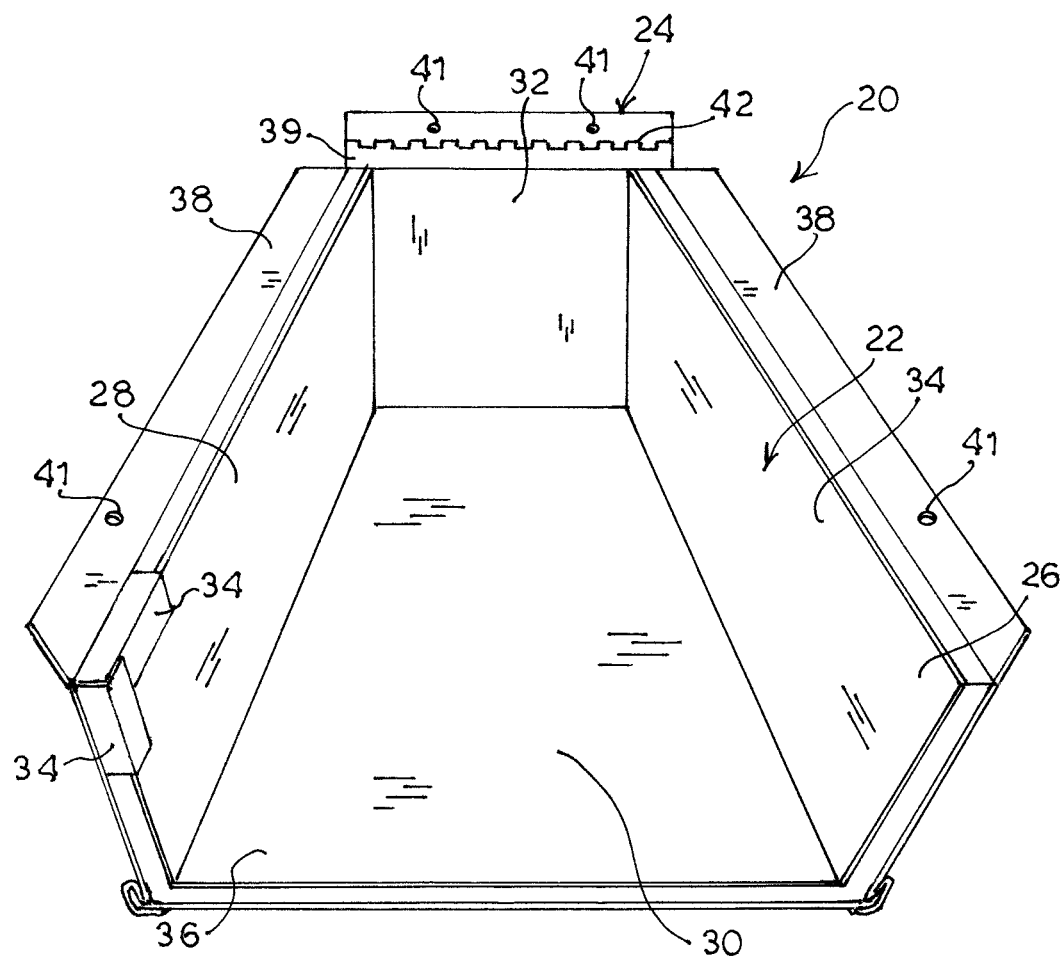
FIG. 2 is a bottom rear perspective view of the housing as shown in FIG. 1.
Figure 3:
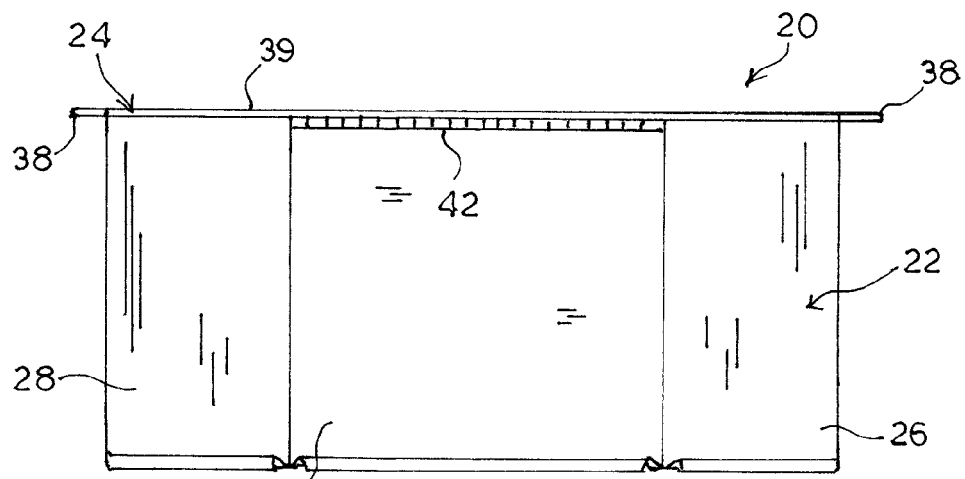
FIG. 3 is a top plan view of the housing as shown in FIG. 1.
Figure 4:
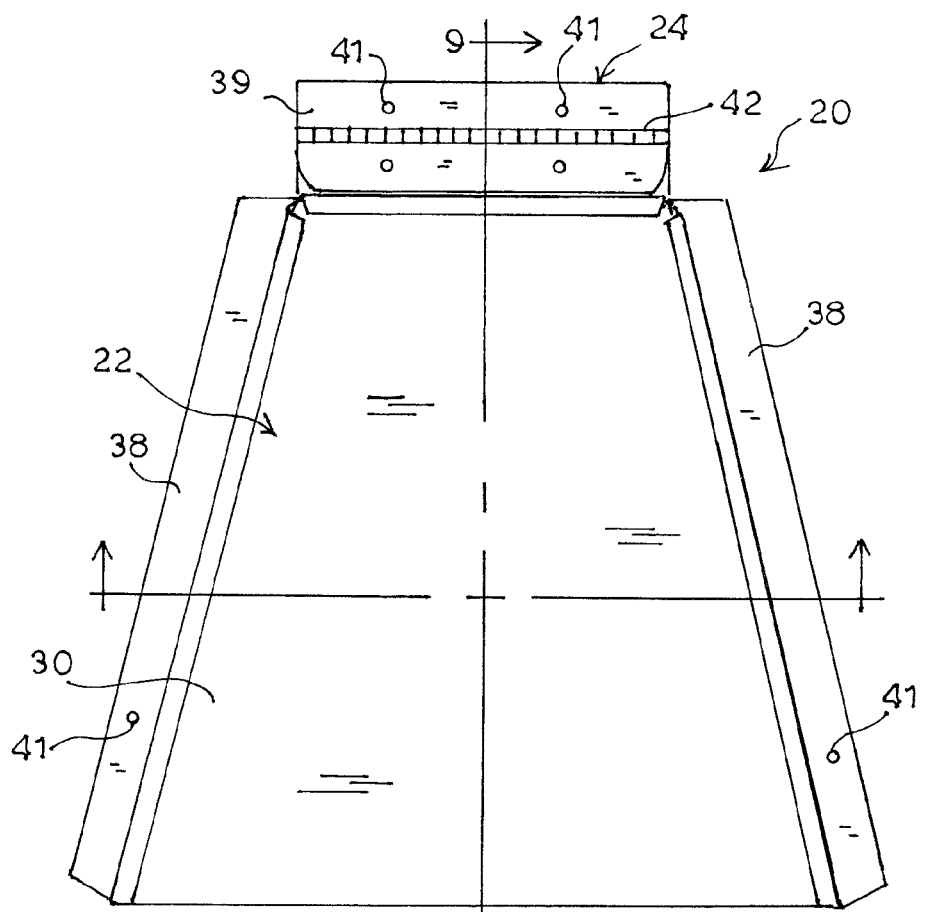
FIG. 4 is a front elevation view of the housing as shown in FIG. 1.
Figure 5:
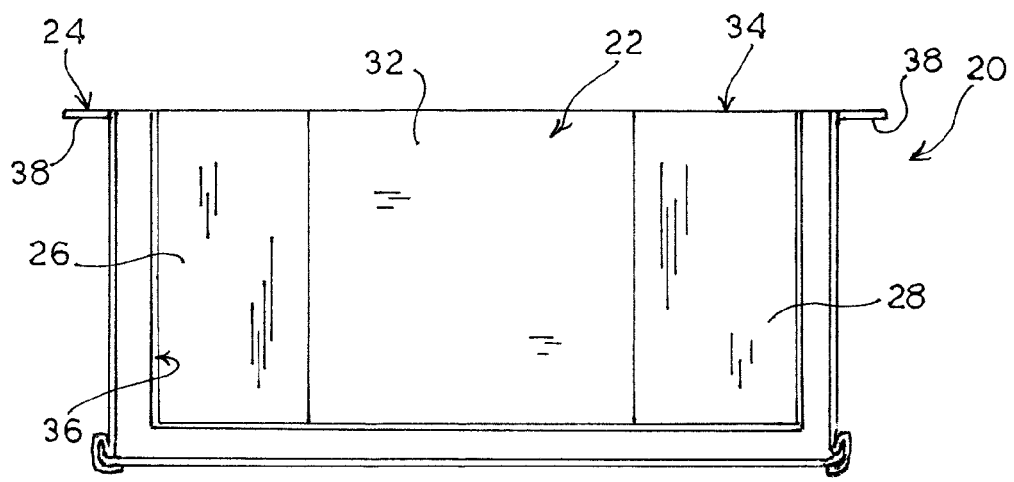
FIG. 5 is a bottom plan view of the housing as shown in FIG. 1.
Figure 6:
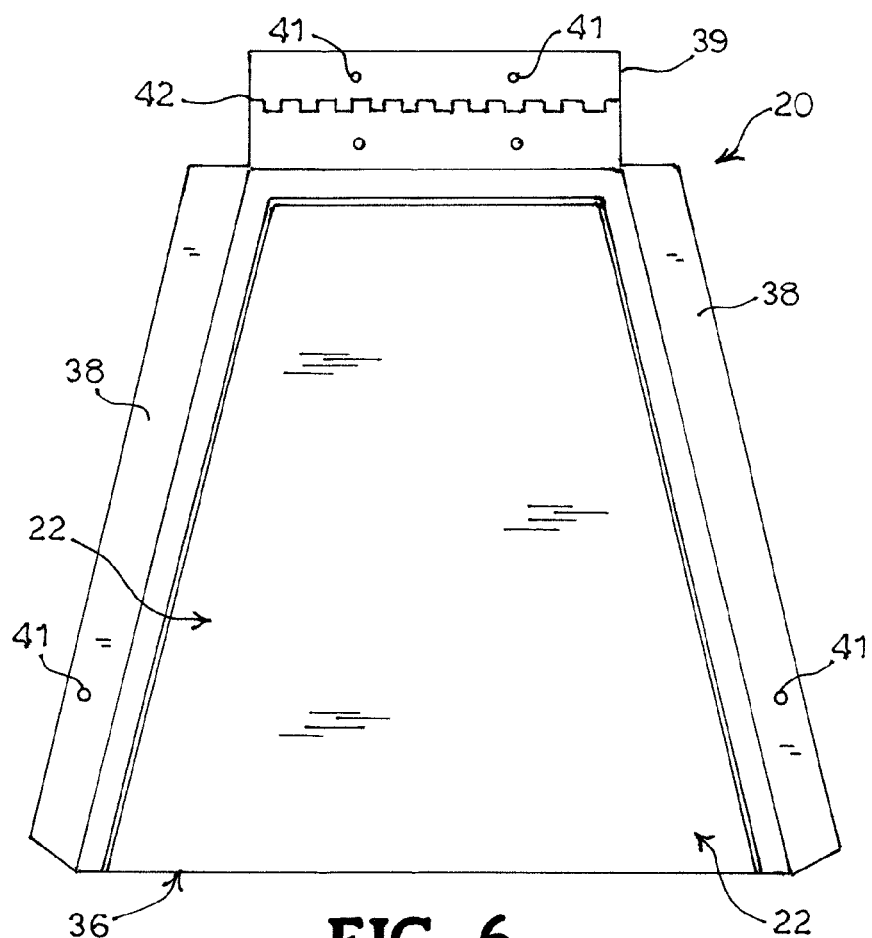
FIG. 6 is a rear elevation view of the housing as shown in FIG. 1.
Figure 8:
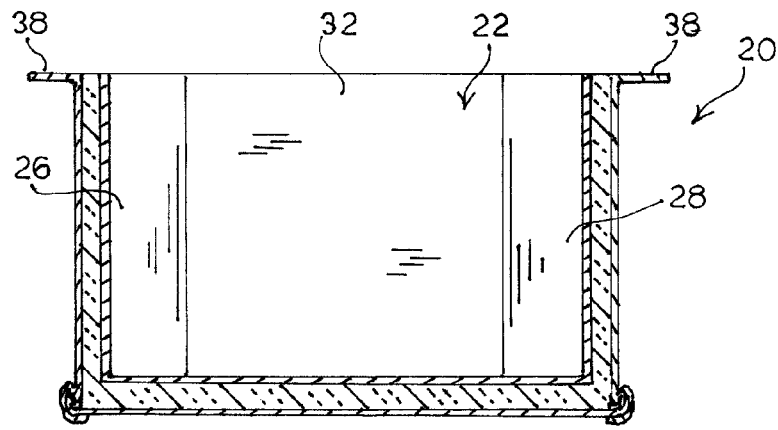
FIG. 8 is a transverse cross-section view of the housing as shown in FIG. 1 and taken along line 8-8 of FIG. 4.
Figure 7:
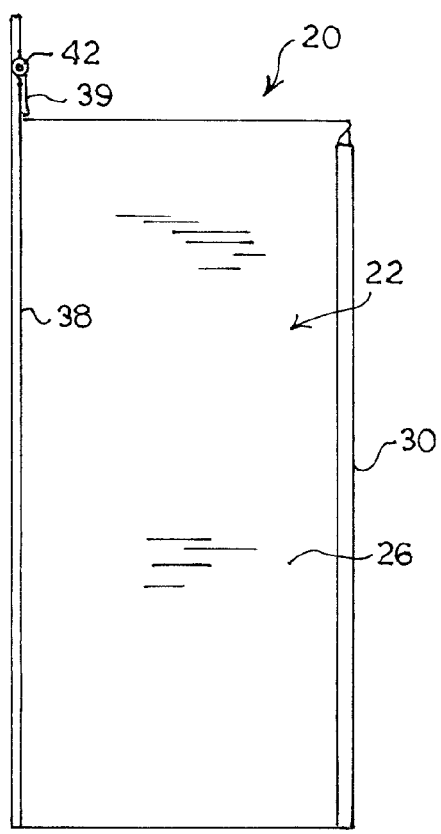
FIG. 7 is a right side elevation view of the housing as shown in FIG. 1, the left side view being a mirror image.
Figure 9:
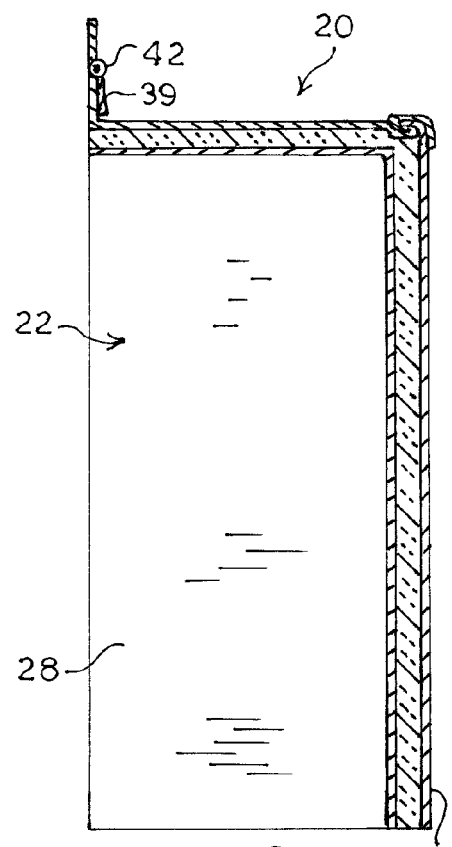
FIG. 9 is a longitudinal cross-section view of the housing as shown in FIG. 1 and taken along line 9-9 of FIG. 4.

Certain terminology is used herein for convenience only and is not to be taken as a limitation on the invention. For example, words such as "upper," "lower," "left," "right," "horizontal," "vertical," "upward," "transverse" and "downward" merely describe the configuration shown in the FIGS. Indeed, the components may be oriented in any direction and the terminology, therefore, should be understood as encompassing such variations unless specified otherwise.

Referring now to the drawings, wherein like reference numerals designate corresponding or similar elements throughout the several views, an embodiment of a housing assembly for accommodating a drain outlet invention is shown in FIGS. 1-7 and generally designated at 20. The housing assembly 20 comprises a housing 22 for accommodating a drain outlet and means for removably securing the housing 22 to a supporting surface 25, such as an exterior wall or foundation of a house.

The housing 22 comprises a plurality of walls, including a right side wall 26 and a left side wall 28, a front wall 30, and a top wall 32 extending transversely between and interconnecting the side walls 26, 28 and the front wall 30. The plurality of walls 26, 28, 30, 32 extend generally continuously from their respective adjoining edges. In the configuration shown, the side walls 26, 28 taper outwardly from the top wall 32 to their distal edges. The housing 22 shown in FIGS. 1-7 defines a rear opening 34 and a bottom opening 36.

The walls 26, 28, 30, 32 may be a generally planar and may take on any shape, such as a substantially rectangular or rhomboid shape as shown. Preferably, the walls 26, 28, 30, 32 are shaped so as to conform to the shape of the supporting surface 25 from which the housing 22 may be suspended. The walls 26, 28, 30, 32 of the housing 22 may be fabricated from any material, including, but not limited to, any sheet metal, (e.g. steel, aluminum, galvanized metal, etc.), plastic, fiberglass, metal or any other type of rigid material. The material of the housing 22 should be able to withstand being hit, bumped or other damage typical around the house. While the housing 22 can be assembled by fastening the separate walls 26, 28, 30, 32 to one another (e.g., as by welding, L-bracket, fasteners, etc.), the housing 22 may be a single integral sheet folded along fold lines. It is understood that the housing 22 may be of any appropriate dimension for accommodating the drain outlet.

Each wall 26, 28, 30, 32 includes an outwardly facing outer surface and an inwardly facing inner surface. The inner surfaces of the walls 26, 28, 30, 32 at least partially define an interior chamber of the housing assembly 20, which is further defined by the support surface 25 to which the housing 22 is mounted. A single layer of foam insulation board having an R-factor of about four lines the inner surface of each of the walls. The foam insulation panels can be attached to the interior surface of the walls 26, 28, 30, 32 of the housing 22 using a standard, commercial-grade "brush-on" or "spray-on" construction adhesive. Other types of insulation may be used, including rotary liner insulation, attached with similar brush-on or spray-on aerosol adhesive or individual "weld-pins." The type and thickness of the insulation, whether foam panel board, spray-on foam, or rotary liner, may be selected as is suitable for the geographical area in which the housing assembly 20 is being used.

The mounting means 24 comprises side flanges 38, extending perpendicularly outwardly from the rear edge of each of the side walls 26, 28 and a top flange 39 extending perpendicularly outwardly from the rear edge of the top wall 32. Each flange 38, 39 may have one or more openings 41 for receiving a fastener 40, e.g., bolts, rods, screws, hooks, nails, etc., for attaching the housing 22 to the support surface 25. The openings 41 may be of any shape, such as a round hole, a keyhole slot, eyelet-shape, etc.

Figure 10:
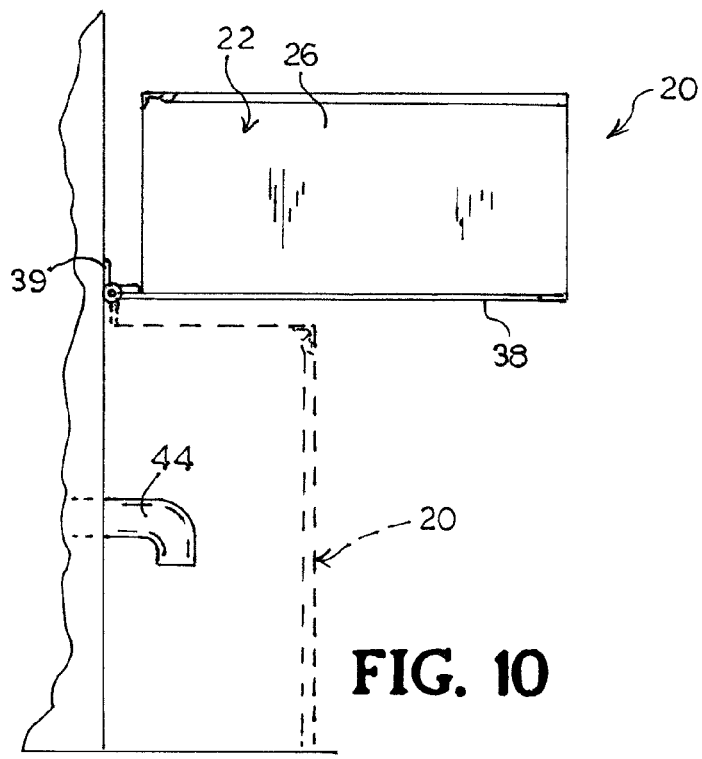
FIG. 10 is a side elevation view of the housing as shown in FIG. 1 installed on an exterior wall over a drain outlet in a first open position and a second closed position shown in phantom.
Figure 11:
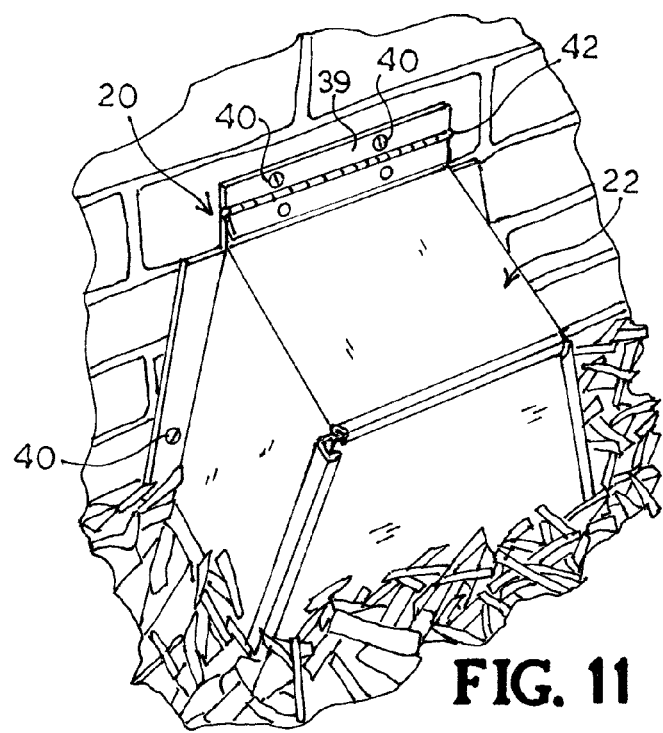
FIG. 11 is a top perspective view of the housing as shown in FIG. 1 installed on the exterior wall over the drain outlet as shown in FIG. 10.

The top flange may comprise a hinge 42 for connecting the housing 22 via the top wall 32 to the support surface 25. One side of the hinge 42 is pivotally connected to a portion of the housing 22. The other side of the hinge 42 is connected to the support surface 25 (FIGS. 10 and 11). The hinge 42 may be removeably fastened (e.g., by fasteners, screws, bolts, etc.) or may be permanently fixed (e.g., as by welding) to the top wall. Any of the side walls 26, 28 of the housing 22 may also comprise a hinge. It is understood that the mounting means 24, as shown and described herein, is not limited to the embodiments. Any other suitable means may be used for attaching the housing 22 to the supporting structure, including magnets and the like.

In use, the housing 22 is secured to a supporting structure 42 surrounding a drain outlet 44 (FIGS. 10 and 11). The housing assembly 20 is positioned with the rear opening of the housing 22 adjacent to the support surface 25 such that each flange 38, 39 of the mounting means 24 engages the support surface 25. Fasteners 40 are inserted through the holes 41 in the flanges 38, 39 and into the support surface 25, as shown. This effectively mounts the housing 22 to the support surface 25, which abuts against the rear edges of the side walls 26, 28, the top wall 30 and the flanges 38. The housing 22 rests on the ground for further supporting the weight of the housing. The interior chamber defined between the surface of the supporting 25 surface and the inner surfaces of the walls 26, 28, 30, 32 of the housing accommodates the drain outlet 44. The extension of the side walls 26, 28 from the support surface 42 determines the depth of the interior chamber defined by the housing 22. The internal space is large enough for receiving the drain outlet. As best seen in FIG. 10 in phantom, the internal space is not accessible via the rear opening 35 or the bottom opening 36 of the housing 22, the former being covered by the support surface 25 and the latter being closed to the ground (FIG. 11). When the drain outlet 44 is covered, the fluid will run from the drain outlet 44 to the ground without risk of freezing under frigid conditions. Mounting the housing 22 around the drain outlet 44 provides an insulated internal space to protect the drain outlet 44 and minimize freezing of the draining fluid. The insulated walls capture some of the residual heat from the condensate itself.

At any time, such as for maintenance, replacement, upgrades, etc., the housing 22 may be detached from the support surface 25 via the mounting means 24, as previously described with regard to FIGS. 10 and 11. Allowing the housing assembly 20 to be easily and quickly removed from the support surface 25 gives free access to the housing 22 of the drain outlet 44 for performing various operations after installation, such as performing repair work, upgrading systems or maintenance or replacing the housing altogether.

FIG. 10 shows one drain outlet 44; however, it should be understood that the housing 24 may house more or less outlets than what is shown. In the embodiments shown, the drain outlet 44 is representative of a drain outlet for a condensing furnace. As shown in FIG. 11, the housing assembly 20 allows mulch to be placed over the top of the drain line, further restricting wind or extreme temps from accessing the drain outlet. The housing assembly 20 also prevents insects, such as wasps, from colonizing the end of the drain outlet, thus blocking the flow of condensate, and again cutting the HVAC system off. The housing assembly 20 also prevents rodents such as squirrels from gnawing away the exposed portion of the drain outline, which would allow the condensate to run into the exterior wall cavities rather than to the exterior. Protecting the (typically plastic and somewhat fragile) exposed drain outlet from damage from mowers, weed eating, and prevention of mulching and annual re-mulching from clogging up end of condensate drain outlet is also a benefit of the drain housing.

Although the present invention has been shown and described in considerable detail with respect to only a few exemplary embodiments thereof, it should be understood by those skilled in the art that it is not intended to limit the invention to the embodiments since various modifications, omissions and additions may be made to the disclosed embodiments without materially departing from the novel teachings and advantages of the invention, particularly in light of the foregoing teachings.

I claim:

1. An apparatus for protecting from freezing fluid flowing from a conduit outlet above ground level on an exterior wall of a building, the freeze protection apparatus comprising:
    (a) a condensing furnace providing a continuous flow of condensate fluid through the conduit outlet;
    (b) a housing adapted for covering the conduit outlet, the housing including
        a top wall having an interior surface and an inner edge, a front wall having an interior surface, a bottom edge, and a lateral dimension, and a pair of opposed side walls, each side wall having an interior surface, an inner edge, a bottom edge and a depth dimension, the side walls interconnecting the top wall and the front wall, wherein the housing partially defines an enclosed area having openings only at a rear aperture and a bottom aperture, and wherein the area of the bottom aperture defined by the lateral dimension of the front wall and the depth dimension of the side walls is substantially larger than the area of the conduit outlet;

(c) thermal insulating material lining the interior surface of the walls of the housing; and (d) means for mounting the housing to the exterior wall adjacent the conduit outlet, wherein the inner edges of the side walls and the top wall contact the exterior wall and the bottom edges of the side walls and the front wall contact the ground at ground level below the conduit outlet for enclosing the conduit outlet within an enclosed space defined by the housing, the exterior wall and the ground level, and wherein heat is retained within the housing to prevent the condensate fluid within the conduit from freezing.

2. The freeze protection apparatus as recited in claim 1, wherein the walls define a rectangular shape.

3. The freeze protection apparatus as recited in claim 1, further comprising flanges at the inner edges of the side wall and the top wall.

4. The freeze protection apparatus as recited in claim 1, further comprising a hinge for hingedly securing the housing to the exterior wall for pivoting movement between an open position away from the conduit outlet and a closed position enclosing the conduit outlet.

5. The freeze protection apparatus as recited in claim 4, wherein the pivot axis of the housing is about a substantially horizontal axis.

6. An apparatus for protecting from freezing fluid flowing from a conduit outlet above ground level on an exterior wall of a building, the freeze protection apparatus comprising:

(a) a condensing furnace providing a continuous flow of condensate fluid through the conduit outlet;

(b) a housing adapted for covering the conduit outlet, the housing including a top wall having an interior surface and an inner edge, a front wall having an interior surface, a bottom edge and a lateral dimension, and a plurality of side walls, each side wall having an interior surface, an inner edge, a bottom edge and a depth dimension, the side walls interconnecting the top wall and the front wall, wherein the housing partially defines an enclosed area having openings only at a rear aperture and a bottom aperture, and wherein the area of the bottom aperture defined by the lateral dimension of the front wall and the depth dimension of the side walls is substantially larger than the area of the conduit outlet;

(c) thermal insulating material lining the interior surface of the walls of the housing; and (d) means for mounting the housing to the exterior wall adjacent the conduit outlet, wherein the inner edges of the side walls and the top wall contact the exterior wall and the bottom edges of the side walls and the front wall contact the ground at ground level below the conduit outlet for enclosing the conduit outlet within an enclosed space defined by the housing, the exterior wall and the ground level, and wherein heat is retained within the housing to prevent the condensate fluid within the conduit from freezing.

\* \* \* \* \*